(12) United States Patent
Takahashi et al.

(10) Patent No.: US 8,306,792 B2
(45) Date of Patent: Nov. 6, 2012

(54) SIMULATOR AND SIMULATING METHOD OF HEAT RADIATION ENERGY

(75) Inventors: Keiko Takahashi, Yokosuka (JP); Ryo Onishi, Yokosuka (JP)

(73) Assignee: Japan Agency for Marine-Earth Science & Technology, Yokosuka-shi, Kanagawa (JP)

( * ) Notice: Subject to any disclaimer, the term of this patent is extended or adjusted under 35 U.S.C. 154(b) by 207 days.

(21) Appl. No.: 12/740,261

(22) PCT Filed: Oct. 29, 2007

(86) PCT No.: PCT/JP2007/071022
§ 371 (c)(1),
(2), (4) Date: Aug. 17, 2010

(87) PCT Pub. No.: WO2009/057189
PCT Pub. Date: May 7, 2009

(65) Prior Publication Data
US 2010/0305917 A1 Dec. 2, 2010

(51) Int. Cl.
*G06F 17/10* (2006.01)
(52) U.S. Cl. .............................. 703/2; 703/5
(58) Field of Classification Search .................. 703/2, 5, 703/6
See application file for complete search history.

(56) References Cited

U.S. PATENT DOCUMENTS

| | | | | |
|---|---|---|---|---|
| 3,807,384 A * | 4/1974 | Schach et al. | ................ | 126/680 |
| 6,216,540 B1 * | 4/2001 | Nelson et al. | ................ | 73/633 |
| 7,181,345 B2 * | 2/2007 | Rosenfeld et al. | ................ | 702/3 |
| 7,322,154 B2 * | 1/2008 | Forbis et al. | ................ | 52/3 |
| 7,757,490 B2 * | 7/2010 | Kenessey | ................ | 60/641.12 |
| 2003/0177703 A1 * | 9/2003 | Forbis et al. | ................ | 52/3 |
| 2008/0115425 A1 * | 5/2008 | Forbis et al. | ................ | 52/3 |
| 2010/0138353 A1 * | 6/2010 | Srivastava et al. | ................ | 705/315 |
| 2010/0154785 A1 * | 6/2010 | Hulen | ................ | 126/623 |
| 2010/0305916 A1 * | 12/2010 | Takahashi et al. | ................ | 703/2 |
| 2011/0094500 A1 * | 4/2011 | Hulen | ................ | 126/609 |

OTHER PUBLICATIONS

Haala et al, Modeling Microwave and Hybrid Heating Processes Including Heat Radiation Effects, IEEE Transactions on Microwave Theory and Techniques, vol. 50, No. 5, May 2002, pp. 1346-1354.*
Hagishima, Aya et al.; "An Organic Analysis for Quantitative Estimation of Heat Island by the Revised Architecture-Urban-Soil-Simultaneous Simulation Model, AUSSSM Part. 1 Theoretical Frame of the Model and Results of Standard Solution"; Journal of Architecture, Planning and Environmental Engineering, Architectural Institute of Japan, 2001, No. 550, pp. 79-86.

(Continued)

*Primary Examiner* — Russell Frejd
(74) *Attorney, Agent, or Firm* — Westerman, Hattori, Daniels & Adrian, LLP

(57) ABSTRACT

A simulator of heat radiation energy which includes acquiring 3D spatial data including a plurality of solid objects where the 3D space is defined by a plurality of grids; calculating the form coefficient in all combinations of arbitrary two grids out of the plurality of grids; acquiring the attribute data of each grid including the area, reflectivity, and temperature of the grid; calculating the sum of heat radiation energy by radiation of a grid itself and heat radiation energy by reflection of heat radiation from each grid as heat radiation energy of every grid on the basis of the area of the grid, the form coefficient, the reflectivity of the grid and the temperature of the grid; and outputting the calculation results of heat radiation energy of every grid to an output unit.

6 Claims, 10 Drawing Sheets

OTHER PUBLICATIONS

Hagishima, Aya et al.; "An Organic Analysis for Quantitative Estimation of Heat Island by the Revised Architecture-Urban-Soil-Simultaneous Simulation Model AUSSS Part 2 Quantitative Analysis Based on A Series of Numerical Experiments"; Journal of Architecture, Planninf and Environmental Engineering, Architectural Institute of Japan, 2002, No. 553, Mar. 2002, pp. 91-98.

Hagishima, Aya et al.; "An Organic Analysis for Quantitative Estimation of Heat Island by the Revised Architecture-Urban-Soil-Simultaneous Simulation Model ASSSM Part 3 Sensitivity Analysis on Factors of Urban Heat Island Under Various Meteorological Regions"; Journal of Environmental Engineering, Architectural Institute of Japan, 2006, No. 601, Mar. 2006, pp. 43-50.

Kusaka, Hiroyuki et al.; "Mechanism for Nocturnal Hot and Humid Conditions Using an Urban Weather Model"; Tenki, Japan Weather Association, 2004, No. 51, vol. 2, with partial translation Feb. 2004, Par. Nos. 2 and 4; Figs. 1-4; Table. 1-2, pp. 1-16.

Yamaguchi, Katsuhito et al.; "Numerical Simulation of One—Dimensional Urban Atmosphere Using Canopy Model"; Dai 8 Kai Symposium on Environmental Engineering' 98 Koen Ronbunshu, No. 98-6; Jul. 10, 1998; pp. 392-395.

Takahashi, Keiko; "Multi-scale Multi-physics simulation of weather forecasting and climate projection"; Dai 20 Kai Proceedings on Organizing Committee on Computational Fluid Dynamics Symposium Dec. 20, 2006, p. 1-2.

Notification of Transmittal of Copies of Translational Preliminary Report on Patentability (Form PCT/IB/338) of International Application No. PCT/JP2007/071022 mailed Jun. 10, 2010 with Forms PCT/IB/373 and PCT/ISA/237.

Taiki Sato et al.; "Estimation of thermal sensation index SET* within urban canopy layer based on numerical climate model"; Summaries of Technical Papers of Annual Convention, Architectural Institute of Japan, 2005 with partial translation; Sep. 2005; Par. Nos. 2 and 5; Figs. 1-5; Tables. 1, pp. 1-9.

* cited by examiner x: EAST-WEST DIRECTION
y: NORTH-SOUTH DIRECTION
z: HEIGHT DIRECTION 480 W/m² OR HIGHER 440 W/m² OR HIGHER AND LOWER THAN 480 W/m²

LOWER THAN 440 W/m²

480 W/m² OR HIGHER

440 W/m² OR HIGHER AND LOWER THAN 480 W/m²

LOWER THAN 440 W/m²

▓ 480 W/m² OR HIGHER

▦ 440 W/m² OR HIGHER AND LOWER THAN 480 W/m²

░ LOWER THAN 440 W/m²

SIMULATOR AND SIMULATING METHOD OF HEAT RADIATION ENERGY

TECHNICAL FIELD

The present invention relates to a simulation for thermal radiation energy, which takes into account real three-dimensional contours in a city.

BACKGROUND ART

A phenomenon in which the temperature of an urban area becomes higher than the temperatures of the surrounding areas is called "heat island phenomenon."

In recent years, the heat island phenomenon in cities has been said to be a cause of worsening urban environments in conjunction with the influences of global warming. It is said that in the last 100 years, the global average temperature has risen by 0.6° C., while in Japan the temperatures in large cities have risen by 2.4° C., and the temperature in Tokyo has risen by 2.9° C.

Clusters of high-rise buildings constructed of various materials, exhaust heat produced by automobile engines and the like, influences of road paving with asphalt, and the like, which represent urban-specific environmental structure, are regarded to be accelerating the heat storage effect of the heat island.

There is still much uncertainty about the heat storage mechanism in such urban-specific environmental structure. In order to explore effective measures against the heat island phenomenon, there is a demand for clarifying the heat storage mechanism in the urban-specific environmental structure.

In clarifying the urban heat storage mechanism, it is essential to practically deal with radiation processes such as a radiation process between buildings and a radiation process between a building and a road, as well as to identify heat sources, such as artificial heat release, and to perform quantification thereof.

Conventionally, there have been models built for clarifying, in a city model, the heat storage mechanism caused by the radiation. Examples of the main methods of the conventional models include the following.
(1) A single building or a plurality of buildings having simple contours are set as subjects.
(2) A plurality of buildings having continuous and uniform contours are set as subjects.
(3) A canopy model representing vertical two-dimensional radiation processes between the ground surface and the atmosphere is used.
(4) The average amount of radiation is determined based on a statistical average value.

In those methods, in order to keep the calculation cost lower, the contours, the arrangement, and the like of real three-dimensional buildings are simplified or subjected to smoothing. Accordingly, those methods do not correspond precisely to the three-dimensional contours of real buildings. For this reason, those conventional models may result in divergences from the real thermal radiation processes.

Non-patent Document 1: Taiki Sato, Shuzo Murakami, Ryozo Ooka, Yoichi Kawamoto: "ESTIMATION OF STANDARD EFFECTIVE TEMPERATURE (SET) AT THE PEDESTRIAN AREA BASED ON NUMERICAL CLIMATE MODEL", Summaries of Technical Papers of Annual Convention, Architectural Institute of Japan, 2005.

Non-patent Document 2: Hiroyuki Kusaka, Fujio Kimura: "MECHANISM FOR NOCTURNAL HOT AND HUMID CONDITIONS USING AN URBAN WEATHER MODEL", Tenki, Japan Weather Association, 2004, No. 51 (2), pp. 95-98.

Non-patent Document 3: Aya Hagishima, Jun Tanimoto, Tadahisa Katayama, Kenji Ohara: "AN ORGANIC ANALYSIS FOR QUANTITATIVE ESTIMATION OF HEAT ISLAND BY THE REVISED ARCHITECTURE-URBAN-SOIL-SIMULTANEOUS SIMULATION MODEL (AUSSSM): PART 1 THEORETICAL FRAME OF THE MODEL AND RESULTS OF STANDARD SOLUTION", Journal of Architecture, Planning and Environmental Engineering, Architectural Institute of Japan, 2001, No. 550, pp. 79-86.

Non-patent Document 4: Aya Hagishima, Jun Tanimoto, Tadahisa Katayama, Kenji Ohara: "AN ORGANIC ANALYSIS FOR QUANTITATIVE ESTIMATION OF HEAT ISLAND BY THE REVISED ARCHITECTURE-URBAN-SOIL-SIMULTANEOUS SIMULATION MODEL (AUSSSM): PART 2 QUANTITATIVE ANALYSIS BASED ON A SERIES OF NUMERICAL EXPERIMENTS", Journal of Architecture, Planning and Environmental Engineering, Architectural Institute of Japan, 2002, No. 553, pp. 91-98.

Non-patent Document 5: Aya Hagishima, Jun Tanimoto, Fumihiro Asano: "AN ORGANIC ANALYSIS FOR QUANTITATIVE ESTIMATION OF HEAT ISLAND BY THE REVISED ARCHITECTURE-URBAN-SOIL-SIMULTANEOUS SIMULATION MODEL (AUSSSM): PART 3 SENSITIVITY ANALYSIS ON FACTORS OF URBAN HEAT ISLAND UNDER VARIOUS METEOROLOGICAL REGIONS", Journal of Environmental Engineering, Architectural Institute of Japan, 2006, No. 601, pp. 43-50.

DISCLOSURE OF THE INVENTION

Problem to be Solved by the Invention

The present invention has an object to provide a simulation device that is intended for real three-dimensional contours, such as a group of buildings in a city, and is capable of calculating thermal radiation energy with high accuracy.

Means for Solving the Problem

In order to achieve the object described above, the present invention employs the following means.

The present invention provides a simulation device for thermal radiation energy including:

three-dimensional data acquiring means for acquiring three-dimensional space data obtained by defining a three-dimensional space by means of a plurality of grids, the three-dimensional space data containing a plurality of three-dimensional objects;

form factor calculating means for calculating a form factor for each combination of two arbitrary grids of the plurality of grids;

grid attribute data acquiring means for acquiring attribute data of each grid, which contains an area, a reflectance, and a temperature of the each grid;

thermal radiation energy calculating means for calculating, as thermal radiation energy of the each grid, based on the area of the each grid, the form factor, the reflectance of the each grid, and the temperature of the each grid, a sum of thermal radiation energy emitted from an own grid and thermal radiation energy obtained through reflection of a thermal radiation ray emitted from each grid; and output means for outputting a calculation result for the thermal radiation energy of the each grid to an output device.

According to the present invention, the thermal radiation energy may be calculated for each portion of the three-dimensional contours in an arbitrary space.

The present invention may be implemented as a simulation method having the same features as the simulation device for thermal radiation energy according to the present invention, a program for causing an information processing device (computer) to function as the simulation device for thermal radiation energy, and a recording medium storing the program.

Effects of the Invention

According to the present invention, it is possible to provide the simulation device that is intended for the real three-dimensional contours, such as a group of buildings in a city, and is capable of calculating the thermal radiation energy with high accuracy.

| Description of Symbols | |
|---|---|
| 100 | simulation device |
| 102 | operation section |
| 104 | storage section |
| 106 | interface (I/F) |
| 108 | memory |
| 110 | communication section |
| 200 | input device |
| 300 | output device |
| 400 | storage device |

BEST MODE FOR CARRYING OUT THE INVENTION

With reference to the drawings, description is given of an embodiment of the present invention. The description of the embodiment is given by way of example, and the present invention is not limited to the configuration of the embodiment.

Embodiment

System Configuration

Figure 1:
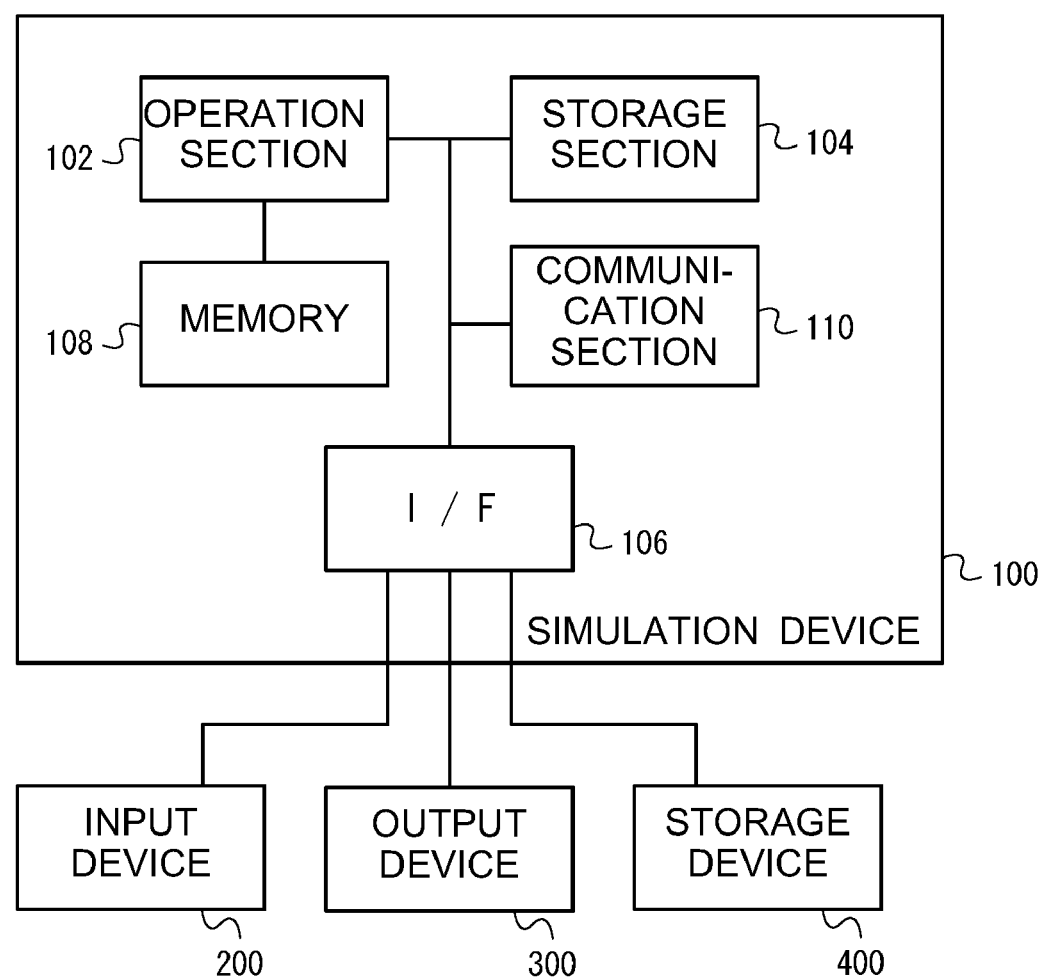
FIG. 1 is a diagram illustrating a system configuration.

FIG. 1 is a diagram illustrating a system configuration of this embodiment. A system according to this embodiment includes a simulation device 100, an input device 200, an output device 300, and a storage device 400.

The simulation device 100 includes an operation section 102 that mainly performs calculation (operation), a storage section 104 that stores initial data, program, and the like, an interface (I/F) 106 that performs input/output with respect to an external device, a memory 108 in which a program and data to be executed by the operation section 102 are expanded, and a communication section 110 having the function of communicating with the outside.

The operation section 102 is capable of functioning as three-dimensional space data acquiring means, form factor calculating means, grid attribute data acquiring means, thermal radiation energy calculating means, and output means. Alternatively, another independent operation section than the operation section 102 may function as one or a plurality of those means. Each of those components may be configured as a program executed on the operation section 102 of the simulation device 100. Alternatively, some or all of the components may be configured by hardware circuitry.

The input device 200 includes a pointing device and the like, such as a keyboard and a mouse. The output device 300 is a computer including a display such as an LCD or a CRT monitor, a printer, and the like. The storage device 400 includes a hard disk drive (HDD), a flexible disk drive, a CD drive, a DVD drive, and the like. The storage device 400 is further capable of recording data and the like stored in the storage section 104 on a recording medium inserted into the storage device 400. The storage device 400 may be used as alternate means to the storage section 104.

<Processing Flow>

Figure 2:
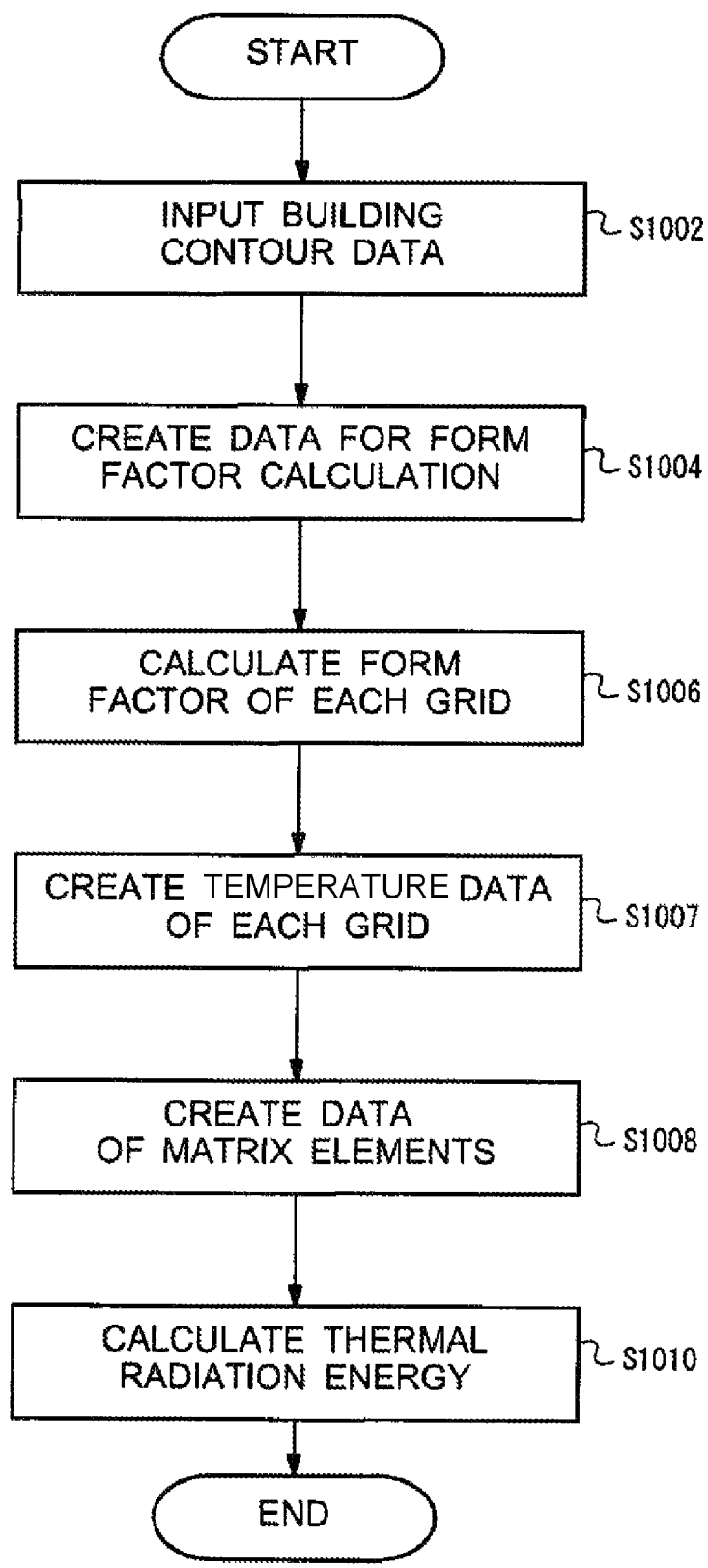
FIG. 2 is a diagram illustrating a flow showing a simulation method.

FIG. 2 is a diagram illustrating a processing flow of a thermal radiation simulation according to this embodiment.

First, data on three-dimensional contours of a subject urban space of the simulation is input (S1002). The three-dimensional contours of the urban space are defined by specifying three-dimensional coordinates that correspond to real three-dimensional objects including artificial structures (walls of buildings, rooftop surfaces, road surfaces, etc.), natural structures (trees, cliffs, ground surfaces, etc.; clouds and the like may also be contained), and the like. The three-dimensional coordinates may be provided using any coordinate system, such as an orthogonal coordinate system or a polar coordinate system. The three-dimensional contours may be defined, for example, by a user using the input device 200 to input the data. The input data is stored in the storage section 104.

The storage section 104 and the memory 108 may store the three-dimensional contour data that is input from the input device. Alternatively, the storage section 104 and the memory 108 may store the three-dimensional contour data that is stored in the storage device 400 in advance. Alternatively, the storage section 104 and the memory 108 may store the three-dimensional contour data that is received by the communication section 110.

The operation section 102 acquires, onto the memory, data on the three-dimensional contours of the three-dimensional objects, constants, variables, and the like that are necessary for the simulation, and then uses the data for the simulation. The term "acquire" may refer to storing data input from the input device 200 in the memory, reading data stored in advance in the storage section 104 or the storage device 400 onto the memory, reading data received by a communication device onto the memory, and the like.

Next, data for form factor calculation is created (S1004). The simulation device 100 divides the three-dimensional contours defined in S1002 into a predetermined number of grids (plane elements). Alternatively, the simulation device 100 may divide the three-dimensional contours into grids having a predetermined area. Data on the grids of the three-dimensional contours is stored in the storage section 104. The user may designate the division number, the area of the grid, and the like. Through controlling the division number, the area of the grid, and the like, the accuracy of calculation results may be controlled. Further, the area of each grid is determined based on the three-dimensional contours, and is then stored in the storage section 104.

Further, the operation section 102 may acquire data on the three-dimensional contours of three-dimensional objects that are divided in advance. The term "acquire" may refer to storing data input from the input device 200 in the memory, reading data stored in advance in the storage section 104 or the storage device 400 onto the memory, reading data received by the communication device onto the memory, and the like.

Next, a form factor is calculated (S1006). The operation section 102 calculates, for each grid of the three-dimensional contours divided into the plurality of grids, the form factors with respect to all the other grids. The form factor and the calculation of the form factor are described later in detail. The form factor calculated for each grid is stored in the storage section 104.

Next, temperature data of each grid is created (S1007). The operation section 102 acquires, onto the memory, surface temperature data of the subject urban space of the simulation. Based on the acquired surface temperature data, the operation section 102 calculates the temperature data for each grid of the three-dimensional contours divided into the plurality of grids. The operation section 102 may calculate the temperature data for each grid of the three-dimensional contours by, for example, complementing the acquired surface temperature data. The temperature data calculated for each grid is stored in the storage section 104.

The surface temperature data of the buildings, the ground surfaces, etc. of the subject urban space of the simulation may be provided, for example, through a data input from the user using the input device 200. The surface temperature data does not need to be provided for all the grids. For grids to which the surface temperature data is not provided, the operation section 102 may perform calculation by, for example, interpolating, based on the provided surface temperature data, the temperature data of an area having no provided value, or performing extrapolation with the use of the values of grids in the vicinity. The input data may be stored in the storage section 104.

The surface temperature data may be provided as different temperatures by, for example, being categorized as a portion in the sun, in which solar radiation is not blocked by a building or the like, and a portion in the shade, in which the solar radiation is blocked by a building or the like.

Further, the temperature data of each grid may be calculated, based on the provided surface temperature data, by taking into account a history of the solar radiation that the surface of a subject three-dimensional object or the like has received. For example, even for a grid of a portion in the shade at the time of calculation, an amount corresponding to a predetermined temperature may be added according to a ratio of time during which the grid has received the solar radiation to a predetermined time period before the calculation.

Next, matrix element data for thermal radiation energy calculation is created (S1008). The emissivity of each grid is provided, for example, through an input from the user using the input device 200. The area of each grid is determined in S1004. The form factor is determined in S1006. The temperature data is determined in S1007. The pieces of data including the emissivity, the temperature, the area, the form factor, etc. of each grid are stored in the storage section 104. Based on the pieces of data stored in the storage section 104, the operation section 102 creates the matrix element data for thermal radiation energy calculation.

Next, the thermal radiation energy is calculated (S1010). Based on the matrix element data created in S1008, the operation section 102 calculates the thermal radiation energy of each grid. The calculation of the thermal radiation energy is described later in detail. The operation section 102 outputs a calculation result of the thermal radiation energy for each grid to such predetermined devices as the output device 300, the storage device 400, and the storage section 104, and ends the processing.

The creation and the calculation of data are performed by the operation section 102 expanding, in the memory 108, programs stored in the storage section 104 and executing the programs. At this time, data input from the input device 200, data stored in advance in the storage section 104 or the storage device 400, or data received by the communication section 110 is used as appropriate.

Apart from the urban space, this embodiment is also applicable to the calculation of the thermal radiation energy in the radiation processes in a closed space surrounded by three-dimensional objects having complex contours, or in an open space.

(Form Factor)

Figure 3:
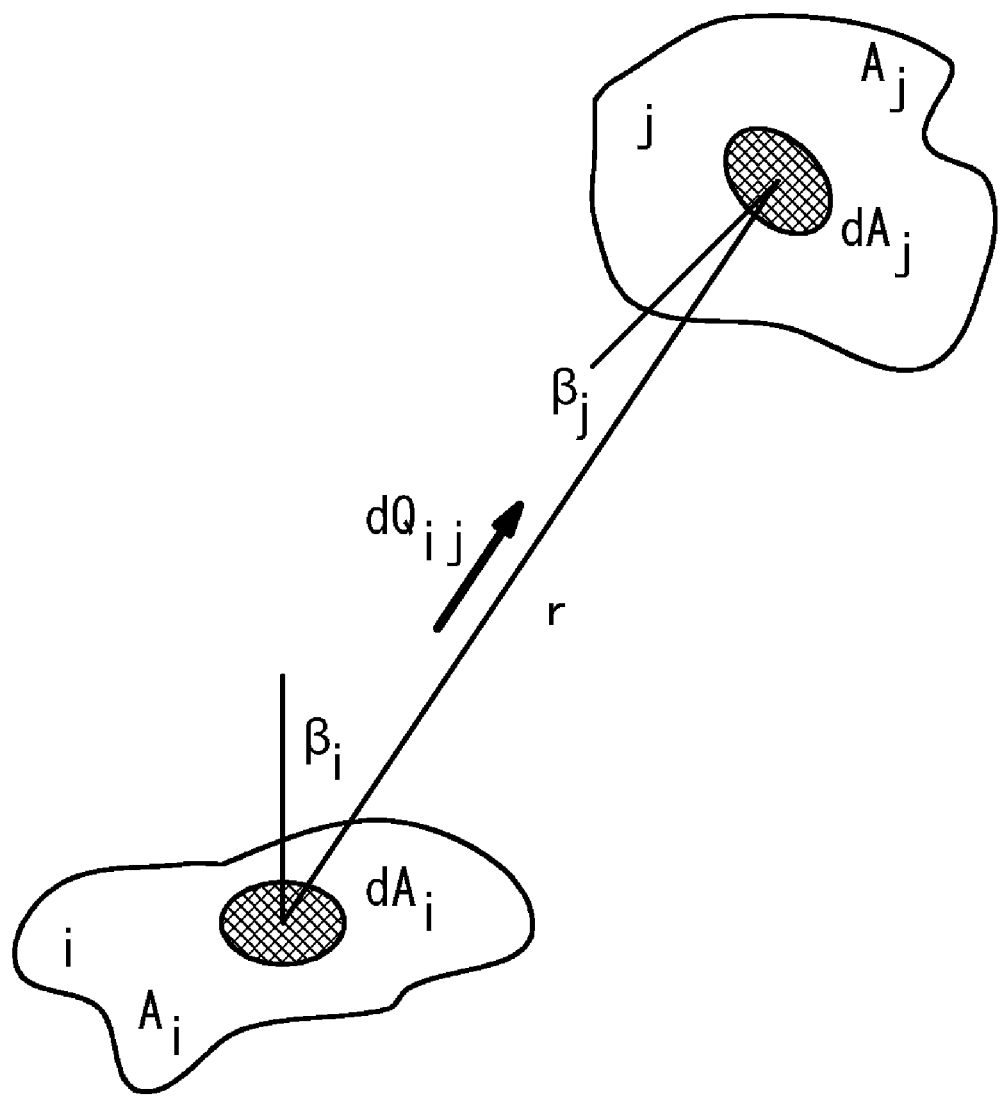
FIG. 3 is a diagram illustrating a form factor.

FIG. 3 is a diagram illustrating the form factor.

As illustrated in FIG. 3, it is assumed that there are planes i and j having areas $A_i$ and $A_j$ respectively. Thermal radiation energy emitted omnidirectionally from the plane i is denoted by $E_iA_i$, where the irradiance of the plane i is denoted by $E_i$. Energy that directly enters the plane j from the plane i is denoted by $Q_{ij}$. Assuming that, of the energy emitted omni-directionally from the plane i, a ratio of energy directly entering the plane j is denoted by $F_{ij}$, $F_{ij}$ is expressed as follows.

$$F_{ij} = \frac{Q_{ij}}{E_i A_i} \qquad \text{[Expression 1]}$$

$F_{ij}$ described above is the form factor.

As illustrated in FIG. 3, a distance between the plane i and the plane j is denoted by r. Here, in the plane i and the plane j, small finite plane elements $dA_i$ and $dA_j$ are defined. Angles formed between the line connecting the plane i and the plane j and normals to the plane i and the plane j are denoted by $\beta_i$ and $\beta_j$, respectively. Radiation energy $dQ_{ij}$ released per unit time toward $dA_j$ within a solid angle $d\omega_j$ centered at the finite plane element $dA_i$ may be determined as follows by using a radiance $I_{bi}$ of the plane i.

$$dQ_{ij} = I_{bi} \cdot dA_i \cdot \cos \beta_i \cdot d\omega_j \qquad \text{[Expression 2]}$$

Here, according to the definition of the solid angle, the following is satisfied.

$$d\omega_j = \frac{dA_j \cos \beta_j}{r^2} \qquad \text{[Expression 3]}$$

Thus, the radiation energy $dQ_{ij}$ is expressed as follows.

$$dQ_{ij} = I_{bi}\frac{\cos\beta_i\cos\beta_j}{r^2}dA_idA_j \qquad \text{[Expression 4]}$$

Further, conversely, radiation energy $dQ_{ji}$ released per unit time from $dA_j$ to $dA_i$ is expressed as follows.

$$dQ_{ji} = I_{bj}\frac{\cos\beta_i\cos\beta_j}{r^2}dA_idA_j \qquad \text{[Expression 5]}$$

A net radiation heat transfer amount $dQ_{net,ij}$ between $dA_i$ and $dA_j$ is obtained based on the following expression.

$$E_i = \pi I_{bi} = \sigma T_i^4 \qquad \text{[Expression 6]}$$

In a case where the temperatures of the plane i and the plane j are $T_i$ and $T_j$, respectively, $dQ_{net,ij}$ is expressed as follows.

$$dQ_{net,ij} = dQ_{ij} - dQ_{ji} \qquad \text{[Expression 7]}$$
$$= \sigma(T_i^4 - T_j^4)\frac{\cos\beta_i\cos\beta_j}{\pi r^2}dA_idA_j$$

A net radiation heat transfer amount between the plane and the plane j is obtained by performing integration on the expression described above.

$$Q_{net,ij} = \sigma(T_i^4 - T_j^4)A_iF_{ij} = \sigma(T_i^4 - T_j^4)A_jF_{ji} \qquad \text{[Expression 8]}$$

where $F_{ij}$ and $F_{ji}$ are the form factors between the plane i and the plane j, and are expressed as follows, respectively.

$$F_{ij} = \frac{1}{A_i}\int_{Ai}\int_{Aj}\frac{\cos\beta_i\cos\beta_j}{\pi r^2}dA_idA_j \qquad \text{[Expression 9]}$$

$$F_{ji} = \frac{1}{A_j}\int_{Ai}\int_{Aj}\frac{\cos\beta_i\cos\beta_j}{\pi r^2}dA_idA_j \qquad \text{[Expression 10]}$$

The form factors between the plane i and the plane j are determined by geometric relative position relation between the plane i and the plane j.

(Calculation of Form Factor)

When the form factors are determined, a Monte Carlo method is employed. Specifically, from the grids of, for example, a wall, photons are emitted in random directions to simulate the behavior of the photons. Relation between a grid that has emitted photons and a grid that has blocked photons in the course of tracking the individual photons is detected.

Focus is given to a given grid on a wall of, for example, a building or a road. Hereinbelow, a wall represented by an arbitrary grid i (i=1~n) is assumed to be a grid plane i (i=1~n).

With the Monte Carlo method, in order to improve the calculation accuracy, an enormous number of particles (photons) are required. For example, in a case where $10^6$ photons are emitted from the respective grids, an error from an analytical solution is of the order of $10^{-4}$. Depending on the accuracy required for the form factors, the number of photons to be emitted may be increased or decreased. Due to the use of the Monte Carlo method, even in the case of complicated three-dimensional contours, such as a building, the form factors may be easily calculated with high accuracy.

The form factors may be determined using the analytical solution based on the three-dimensional contours.

Figure 4:
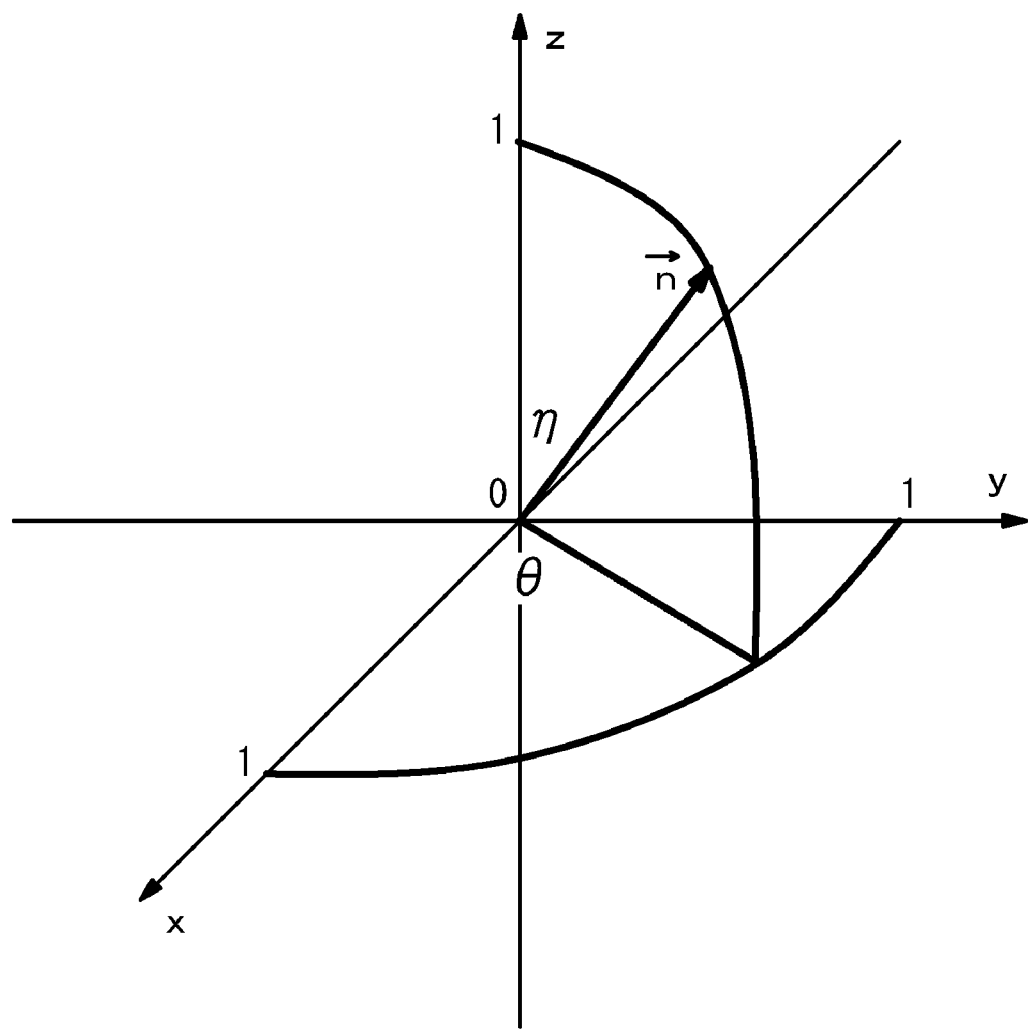
FIG. 4 is a diagram illustrating a unit vector in a radiation direction.

FIG. 4 is a diagram illustrating a unit vector in a radiation direction. In a case where a beam is emitted in a direction defined by an azimuth angle $\theta$ and a zenith angle $\eta$, the unit vector in the radiation direction is expressed as follows.

$$\vec{n} = (\sin\eta\cos\theta, \sin\eta\sin\theta, \cos\eta) \qquad \text{[Expression 11]}$$

In this case, a surface element on a unit sphere having the emission point at the center is expressed as follows.

$$dS = \sin\eta\, d\eta\, d\theta \qquad \text{[Expression 12]}$$

In a case where Lambert's cosine law applies, in terms of $\theta$, a uniform radiation probability is obtained, but, in terms of $\eta$, a radiation probability in a corresponding direction is proportional to $\cos\eta$.

Thus, an integral element is expressed as follows.

$$\cos\eta\, dS = \sin\eta\cos\eta\, d\eta\, d\theta = \frac{1}{2}d(\sin^2\eta)d\theta \qquad \text{[Expression 13]}$$

As for $\theta$ and $\eta$, uniform random numbers $R_\theta$ and $R_\eta$ are set as follows, respectively.

$$\theta = 2\pi R_\theta \qquad \text{[Expression 14]}$$

$$(0 \leq R_\theta \leq 1)$$

$$\sin\eta\cos\eta\, d\eta = c\, dR_\eta \qquad \text{[Expression 15]}$$

$$(0 \leq R_\eta \leq 1)$$

where c is a constant. By integrating both sides thereof, the following expression is derived.

$$c = \frac{1}{2} \qquad \text{[Expression 16]}$$

Then, based on Expression 17, Expression 18 is derived.

$$\frac{1}{2}d(\sin^2\eta) = \frac{1}{2}dR_\eta \qquad \text{[Expression 17]}$$

$$\sin^2\eta = R_\eta \qquad \text{[Expression 18]}$$

In this manner, in the case where Lambert's cosine law applies, a frequency with which a grid emits photons is expressed as follows.

$$\vec{n} = (\sqrt{R_\eta}\cos 2\pi R_\theta, \sqrt{R_\eta}\sin 2\pi R_\theta, \sqrt{1-R_\eta}) \qquad \text{[Expression 19]}$$

According to the emission frequency of photons described above, each grid emits a predetermined number of photons. Each of the photons corresponds to a predetermined amount of energy. Accordingly, by counting the number of photons that have directly entered a grid, the form factor may be determined. By increasing the number of photons to be emitted, the form factor having high accuracy may be determined.

Figure 5:
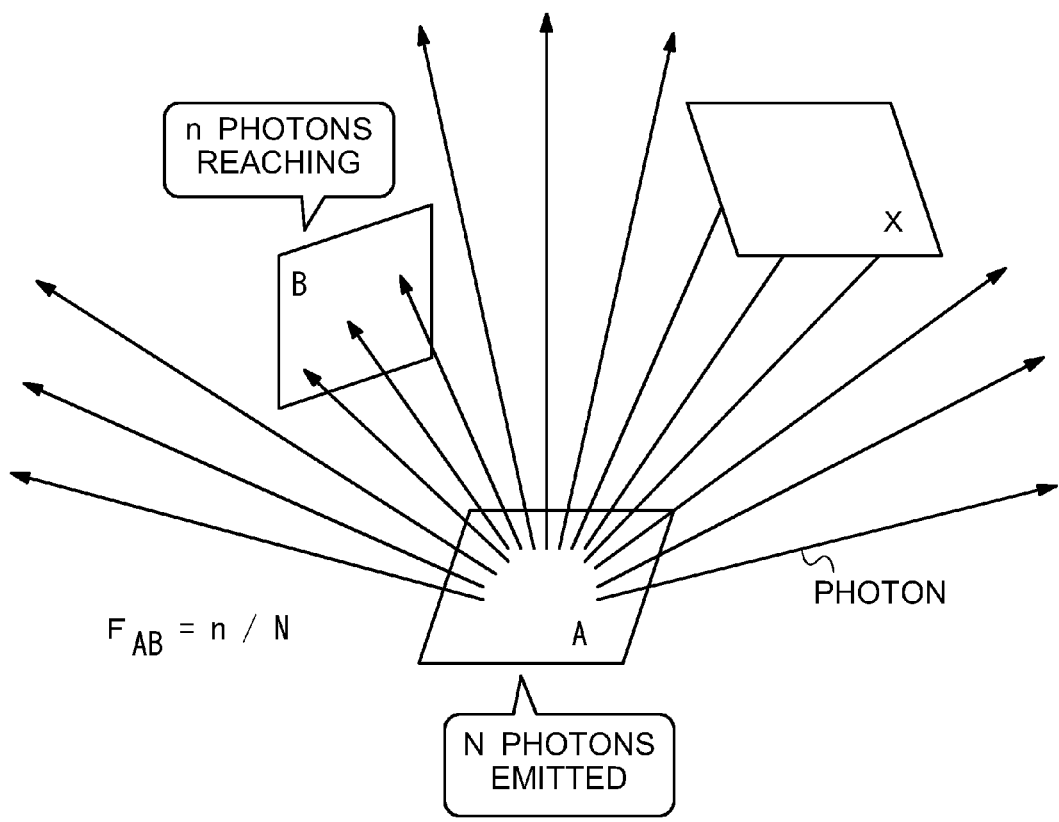
FIG. 5 is a diagram illustrating a state of photons emitted from a grid plane A.

FIG. 5 is a diagram illustrating a state of photons emitted from a grid plane A. Some of the photons emitted from the grid plane A according to the emission frequency reach a grid plane B directly. Accordingly, assuming that a total number of the photons emitted from the grid plane A is N, and the number of the photons reaching the grid plane B directly from the grid plane A is n, a form factor $F_{AB}$ is expressed as follows.

$$F_{AB} = \frac{n}{N} \qquad \text{[Expression 20]}$$

(Calculation of Thermal Radiation Energy)

With regard to a radiation heat transfer process in a non-black body plane, which is an arbitrary grid plane, it is necessary to take into account the reflection of a thermal radiation ray emitted from another arbitrary grid plane. Thermal radiation energy released into a space per unit area per unit time is expressed by the following expression.

$$G_i = \varepsilon_i \sigma T_i^4 + \frac{(1-\alpha_i)}{A_i} \sum_{k=1}^{n} A_k G_k F_{ki} \qquad \text{[Expression 21]}$$

$G_i$: thermal radiation energy released per unit area per unit time from grid plane i (radiosity, irradiance)[W/m²]
$\alpha_i$: absorptivity of grid plane i
$\varepsilon_i$: emissivity of grid plane i
$\sigma$: Stefan-Boltzmann constant (5.67×10⁻⁸ W/m²K⁴)

The first term of the right side represents thermal radiation energy emitted from the own grid plane. The second term of the right side represents thermal radiation energy obtained from the reflection of a thermal radiation ray emitted from an arbitrary grid plane.

Here, with regard to the arbitrary grid plane i (i=1~n), the following expressions are satisfied.

$$\alpha_i = \varepsilon_i \qquad \text{[Expression 22]}$$

and $$A_k F_{ki} = A_i F_{ik} \qquad \text{[Expression 23]}$$

An emissivity ($\varepsilon_i$) is determined based on, for example, the geological feature of a ground surface, or the material of a wall or the like. In the case of the black body, the emissivity is 1.

The temperature ($T_i$) and the emissivity ($\varepsilon_i$) of the grid plane i are provided in advance. The area ($A_i$) of the grid plane i may be determined based on the three-dimensional contours of the building and the like. Further, the form factor ($F_{ij}$) is determined as described above.

Therefore, by solving the following simultaneous equations in terms of n conditional expressions for the thermal radiation energy $G_i$, the thermal radiation energy $G_i$ of each grid plane i (i=1~n) is determined. The matrix element data of this expression may be created based on the parameters described above (emissivity, temperature, etc.).

$$\begin{bmatrix} D_{11} - A_1/r_1 & D_{12} & \cdots & D_{1n} \\ D_{21} & D_{22} - A_2/r_2 & \cdots & D_{2n} \\ \vdots & \vdots & \ddots & \vdots \\ D_{n1} & D_{n2} & \cdots & D_{nn} - A_n/r_n \end{bmatrix} \qquad \text{[Expression 24]}$$

$$\begin{bmatrix} G_1 \\ G_2 \\ \vdots \\ G_n \end{bmatrix} = \begin{bmatrix} -A_1 \varepsilon_1 E_1 / r_1 \\ -A_2 \varepsilon_2 E_2 / r_2 \\ \vdots \\ -A_n \varepsilon_n E_n / r_n \end{bmatrix}$$

$$D_{k1} = A_1 F_{1k} = A_k F_{k1}$$

$$r_k = 1 - \varepsilon_k$$

$$E_k = \sigma_k T_k^4$$

Further, a net radiation heat flux $q_{Ri}$ released from the plane i may be determined from the following expression based on a net radiation heat transfer amount $Q_{Ri}$ released from the plane i.

$$q_{Ri} = \frac{Q_{Ri}}{A_i} = G_i - \frac{1}{A_i} \sum_{k=1}^{n} A_k G_k F_{ki} \qquad \text{[Expression 25]}$$

<Operation and Effect of this Embodiment>

According to this embodiment, complex three-dimensional contours, such as real buildings and the like, are used to calculate the form factors, enabling the calculation of the thermal radiation energy of, for example, walls by taking the reality into account more precisely.

Example

FIGS. 6 to 10 are diagrams illustrating, with the use of the embodiment described above, an example of results of the simulation for the thermal radiation energy $G_i$.

Figure 6:
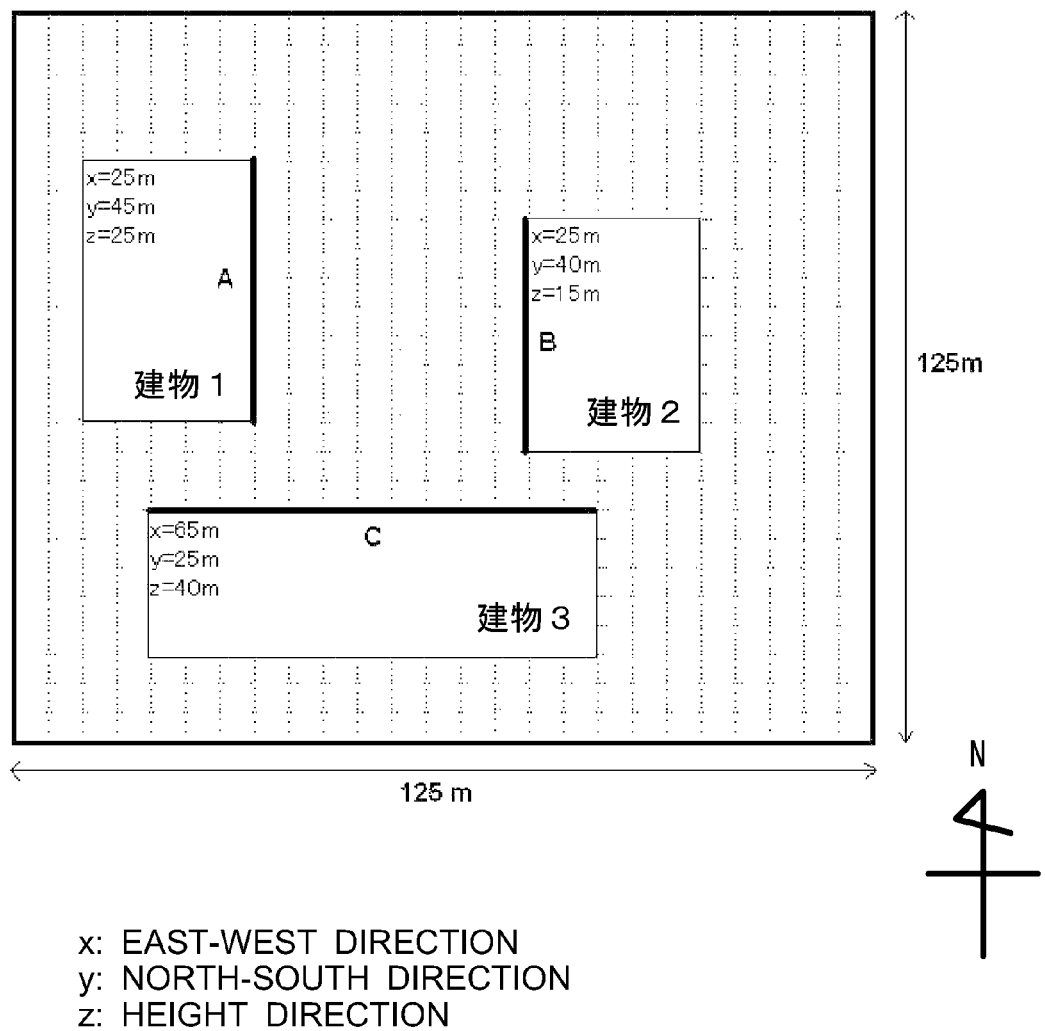
FIG. 6 is a diagram illustrating settings of an area and buildings used for calculation of thermal radiation energy.

FIG. 6 is a diagram illustrating settings of an area and buildings used for the calculation of the thermal radiation energy. FIG. 6 is a diagram obtained by viewing from above the arrangement of the ground surface and the buildings. In this example, as in FIG. 6, in an area of 125 m in north-south direction by 125 m in east-west direction, there are arranged a rectangular parallelepiped building 1 of 25 m in east-west direction by 45 m in north-south direction by 25 m in height, a rectangular parallelepiped building 2 of 25 m in east-west direction by 40 m in north-south direction by 15 m in height, and a rectangular parallelepiped building 3 of 65 m in east-west direction by 25 m in north-south direction by 40 m in height. As illustrated in FIG. 6, it is assumed that the wall on the east side of the building 1 is a wall A, the wall on the west side of the building 2 is a wall B, and the wall on the north side of the building 3 is a wall C.

In FIG. 6, an area in a lattice pattern represents the ground surface. One lattice is 5 m in east-west direction by 5 m in north-south direction. This lattice was used as one unit to perform the simulation. The solar radiation is assumed to be coming from the southwest direction. As initial temperatures, different temperatures were provided between the portion in the sun, in which the solar radiation is not blocked by a building or the like, and the portion in the shade, in which the solar radiation is blocked by a building or the like. Each lattice corresponds to the grid.

Figure 7:
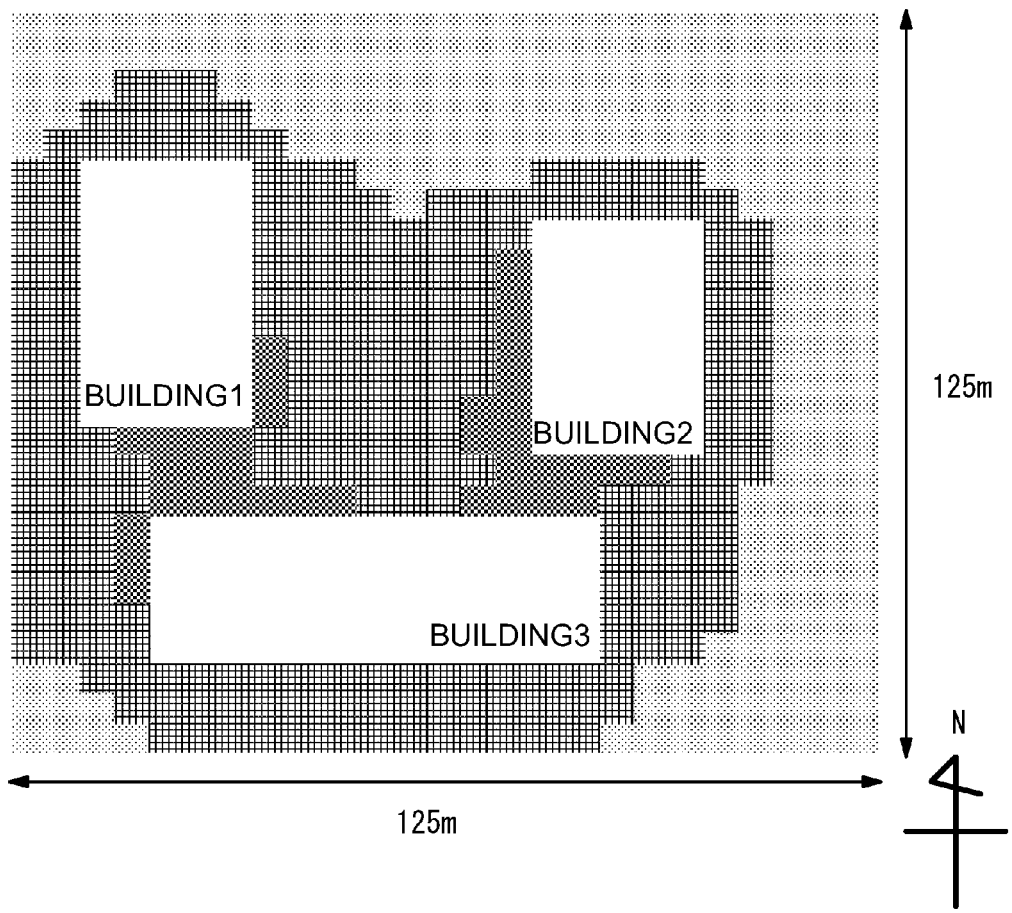
FIG. 7 is a diagram illustrating calculation results for thermal radiation energy of a ground surface.

FIG. 7 is a diagram illustrating calculation results for the thermal radiation energy of the ground surface. Portions corresponding to the buildings are excluded. The thermal radiation energy of the walls is divided into three categories of "420 W/m² or higher", "390 W/m² or higher and lower than 420 W/m²", and "lower than 390 W/m²" for display. Due to reflection from the walls of the buildings, the ground surface in the vicinity of the buildings has higher thermal radiation energy compared to the ground surface apart from the buildings.

Figure 8:
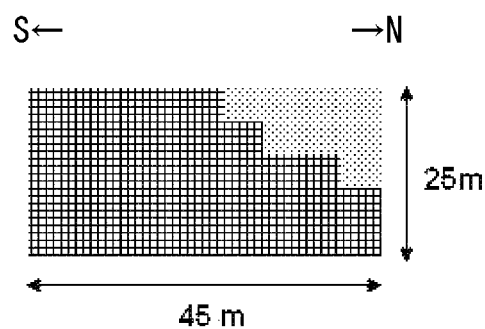
FIG. 8 is a diagram illustrating calculation results for thermal radiation energy of a wall A of a building 1.
Figure 8:
Figure 8:
Figure 8:

FIG. 8 is a diagram illustrating calculation results for the thermal radiation energy of the wall A of the building 1. The abscissa axis represents the north-south direction with the left-hand side representing the south and the right-hand side representing the north. The ordinate axis represents a height direction. Similarly to the east-west direction and the north-south direction, a lattice unit in the height direction is 5 m. The wall A is 45 m in north-south direction by 25 m in height. The thermal radiation energy of the wall is divided into three categories of "480 W/m² or higher", "440 W/m² or higher and lower than 480 W/m²", and "lower than 440 W/m²" for display.

The direction of the sun is southwest, and hence the wall A does not receive the solar radiation directly. However, the south side of the wall A receives influences from the ground surface, the wall B of the building 2, the wall C of the building 3, and the like, and therefore has higher thermal radiation energy.

Figure 9:
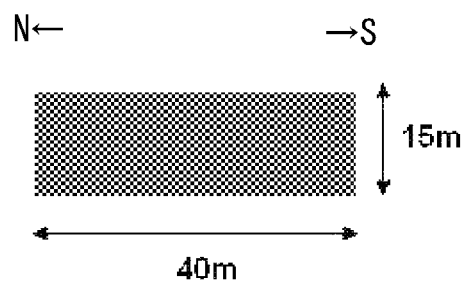
FIG. 9 is a diagram illustrating calculation results for thermal radiation energy of a wall B of a building 2.
Figure 9:
Figure 9:
Figure 9:

FIG. 9 is a diagram illustrating calculation results for the thermal radiation energy of the wall B of the building 2. The abscissa axis represents the north-south direction with the left-hand side representing the north and the right-hand side representing the south. The ordinate axis represents the height direction. Similarly to the east-west direction and the north-south direction, the lattice unit in the height direction is 5 m. The wall B is 40 m in north-south direction by 15 m in height. The thermal radiation energy of the wall is divided into three categories of "480 W/m² or higher", "440 W/m² or higher and lower than 480 W/m²", and "lower than 440 W/m²" for display.

The direction of the sun is southwest, and hence the wall B receives the solar radiation directly. As a result, the wall B has higher thermal radiation energy compared to the wall A of the building 1 and the wall C of the building 3.

Figure 10:
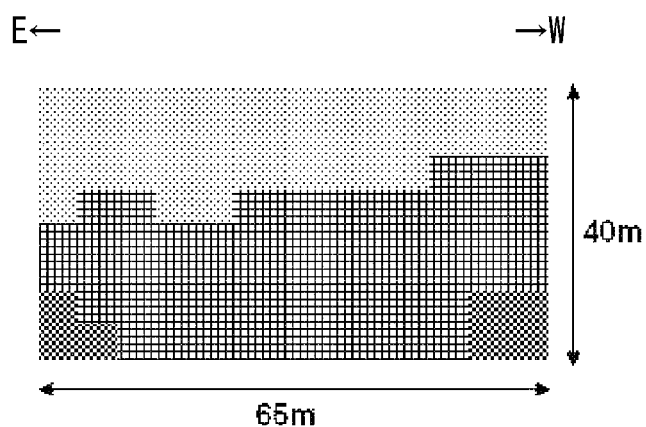
FIG. 10 is a diagram illustrating calculation results for thermal radiation energy of a wall C of a building 3.

FIG. 10 is a diagram illustrating calculation results for the thermal radiation energy of the wall C of the building 3. The abscissa axis represents the east-west direction with the left-hand side representing the east and the right-hand side representing the west. The ordinate axis represents the height direction. Similarly to the east-west direction and the north-south direction, the lattice unit in the height direction is 5 m. The wall C is 65 m in east-west direction by 40 m in height. The thermal radiation energy of the wall is divided into three categories of "480 W/m² or higher", "440 W/m² or higher and lower than 480 W/m²", and "lower than 440 W/m²" for display.

The wall C of the building 3 is a wall facing the north, and therefore does not receive the solar radiation directly. However, the wall C receives influences of reflection from the ground surface, and the walls of the building 1 and the building 2. The lower right and the lower left of the wall C, which receive strong influences therefrom, have higher thermal radiation energy.

With the thermal radiation simulation according to the embodiment, the thermal radiation energy of each grid may be calculated taking into account the influence of reflection from each grid plane.

<Computer-Readable Recording Medium>

A program for causing a computer or another machine or device (hereinafter, referred to as computer or the like) to implement any one of the functions may be recorded on a recording medium readable from the computer or the like. Then, the program recorded on the recording medium is read and executed by the computer or the like, to thereby provide the function.

Here, the recording medium readable from the computer or the like is such a recording medium that accumulates information, such as data and programs, electrically, magnetically, optically, mechanically, or through chemical action, and is readable from the computer or the like. In such a medium, there may be provided components that constitute a computer, such as an operation section and a memory, to thereby cause the operation section to execute the program.

Further, of such recording media, examples of the recording media detachable from the computer or the like include a flexible disk, a magneto-optical disk, a CD-ROM, a CD-R/W, a DVD, a DAT, an 8-mm tape, and a memory card.

Further, examples of the recording media installed in the computer or the like include a hard disk and a read only memory (ROM).

The invention claimed is:

1. A simulation device for thermal radiation energy, comprising:
    three-dimensional data acquiring means for acquiring three-dimensional space data obtained by defining a three-dimensional space by means of a plurality of grids, the three-dimensional space data containing a plurality of three-dimensional objects;
    form factor calculating means for calculating a form factor for each combination of two arbitrary grids of the plurality of grids;
    grid attribute data acquiring means for acquiring an area, a reflectance, and a temperature of each grid;
    thermal radiation energy calculating means for calculating, as thermal radiation energy of each grid, based on the area of each grid, the form factor, the reflectance of each grid, and the temperature of each grid, a sum of thermal radiation energy emitted from each grid and thermal radiation energy obtained through reflection of a thermal radiation ray emitted from each grid; and
    output means for outputting a calculation result for the thermal radiation energy of each grid to an output device.

2. A simulation device for thermal radiation energy according to claim 1, wherein the form factor calculating means calculates the form factor by using a Monte Carlo method.

3. A simulation method for thermal radiation energy, comprising:
    reading, by an information processing device, into a storage device, three-dimensional space data obtained by defining a three-dimensional space by means of a plurality of grids, the three-dimensional space data containing a plurality of three-dimensional objects;
    calculating, by the information processing device, a form factor for each combination of two arbitrary grids of the plurality of grids, and the storing the form factor in the storage device;
    reading, by the information processing device, into the storage device, an area, a reflectance, and a temperature of each grid;
    calculating, by the information processing device, as thermal radiation energy of each grid, based on the area of each grid, the form factor, the reflectance of each grid, and the temperature of each grid, a sum of thermal radiation energy emitted from each grid and thermal radiation energy obtained through reflection of a thermal radiation ray emitted from each grid; and
    outputting, by the information processing device, a calculation result for the thermal radiation energy of each grid to an output device.

4. A simulation method for thermal radiation energy according to claim 3, wherein the form factor is calculated by using a Monte Carlo method.

5. A simulation device for thermal radiation energy, comprising a computer for performing the simulation, the computer comprising:
    a three-dimensional data acquirer for acquiring three-dimensional space data obtained by defining a three-dimensional space with a plurality of grids, the three-dimensional space data containing a plurality of three-dimensional objects;

a form factor calculator for calculating a form factor for each combination of two arbitrary grids of the plurality of grids;

a grid attribute data acquirer for acquiring an area, a reflectance, and a temperature of each grid;

a thermal radiation energy calculator for calculating, as thermal radiation energy of each grid, based on the area of each grid, the form factor, the reflectance of each grid, and the temperature of each grid, a sum of thermal radiation energy emitted from each grid and thermal radiation energy obtained through reflection of a thermal radiation ray emitted from each grid; and an outputter for outputting a calculation result for the thermal radiation energy of each grid to an output device.

6. A simulation device for thermal radiation energy according to claim 5, wherein the form factor calculator calculates the form factor by using a Monte Carlo method.

* * * * *